Oct. 20, 1936.    J. W. TATTER    2,057,802
CLUTCH
Filed Feb. 5, 1931    3 Sheets-Sheet 1
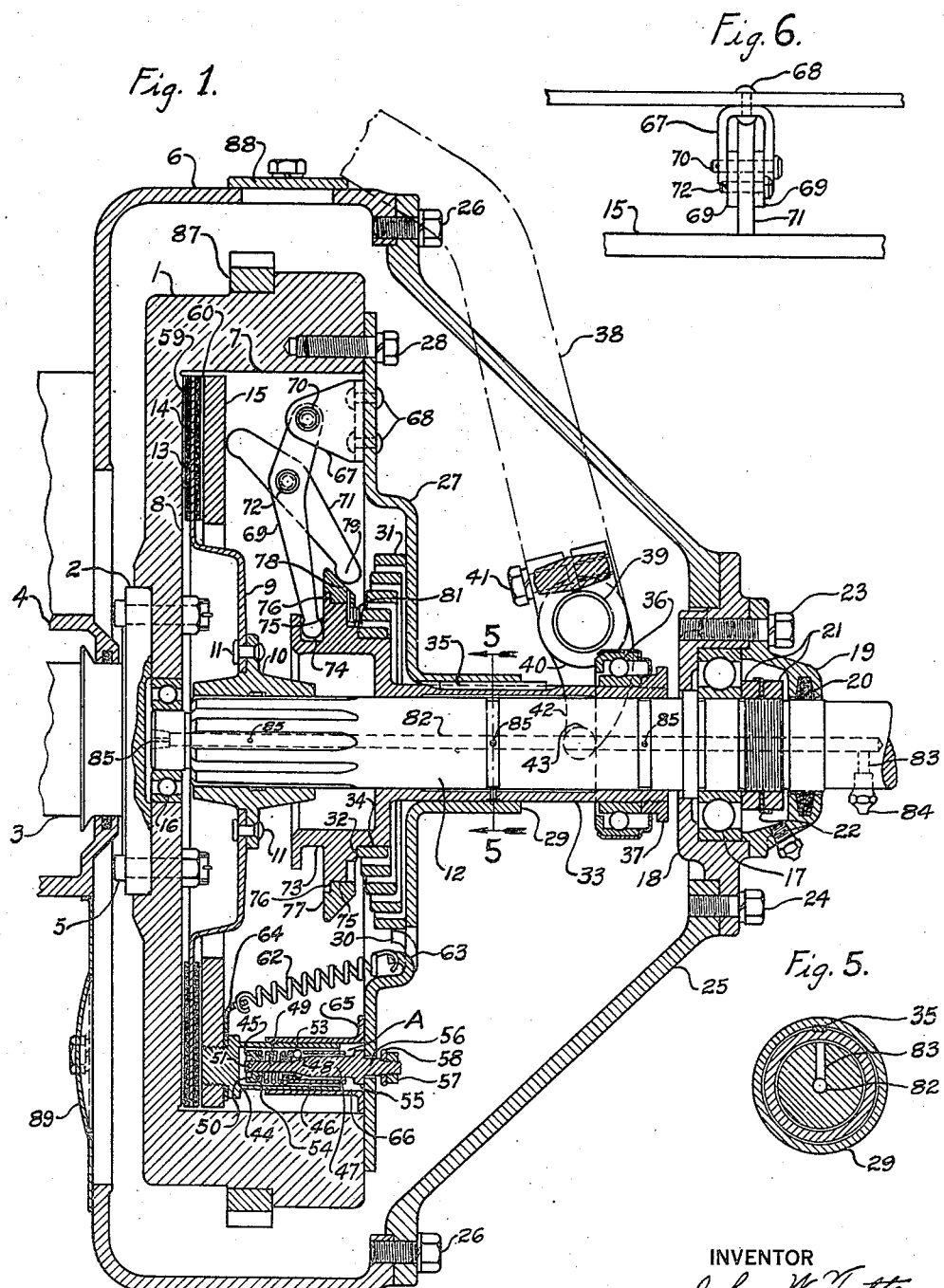

Oct. 20, 1936.  J. W. TATTER  2,057,802
CLUTCH
Filed Feb. 5, 1931  3 Sheets-Sheet 2
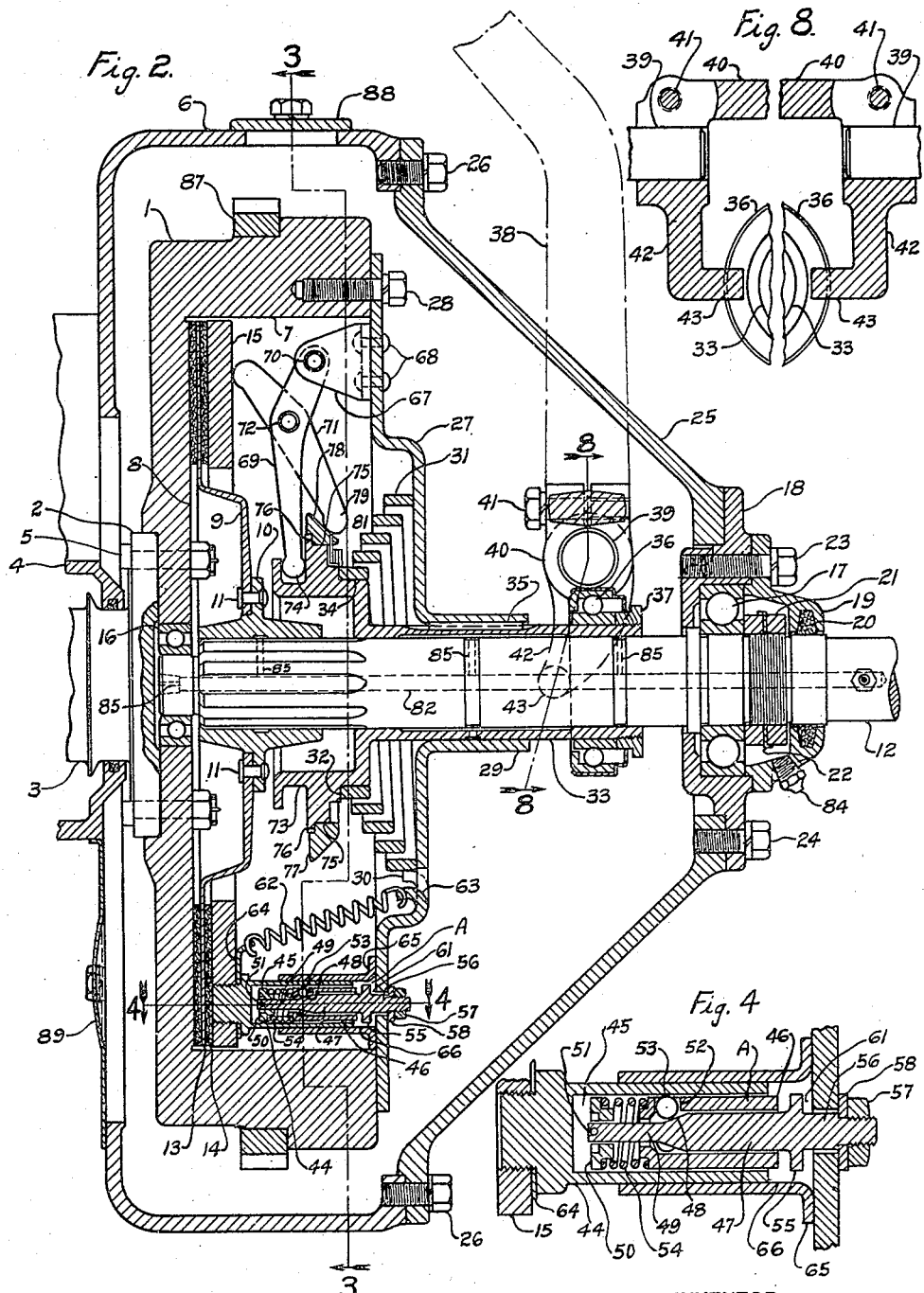

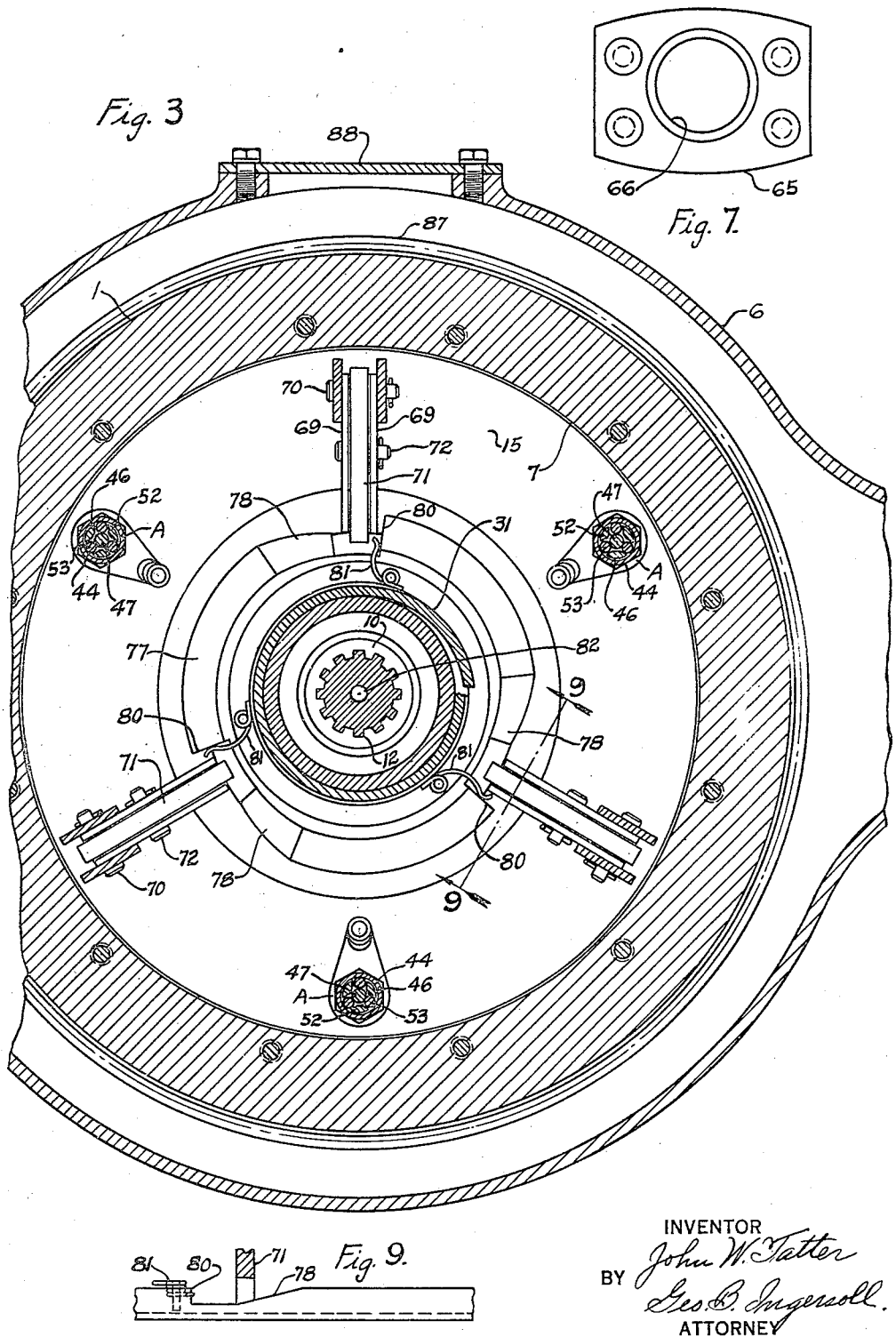

Patented Oct. 20, 1936

2,057,802

UNITED STATES PATENT OFFICE 2,057,802

CLUTCH

John W. Tatter, Detroit, Mich., assignor, by mesne assignments, of one-half to Ella I. Ingersoll, Dearborn, Mich.

Application February 5, 1931, Serial No. 513,551

20 Claims. (Cl. 192—111)

My invention relates to improvements in clutches for motor vehicles, said clutches comprising friction members and the objects of my improvement are, first, to provide a clutch with automatic means for taking up wear in the friction members; second, to provide a clutch with friction members actuated in engagement by a plurality of lever assemblies, each of said lever assemblies comprising a plurality of levers; third, to provide a clutch having friction members together with means for taking up the wear in the friction members, said automatic means engaging means for driving the thrust member; and, fourth, to provide a clutch having friction members together with a central sleeve for operating said friction members together with means on the sleeve for automatically taking up clearances in the actuated members.

I attain these objects by the mechanism illustrated in the accompanying drawings, in which—

Figure 1 is a sectional view of the clutch assembly within a flywheel of a motor, together with its enclosing housings, said view disclosing the clutch members at the beginning of their engagement; Fig. 2, a sectional view of the clutch assembly within a flywheel of a motor, together with its enclosing housings, said view disclosing the clutch members in a fully engaged position; Fig. 3, a rear elevation of the clutch assembly in the flywheel of the motor, said clutch being disclosed less its outer enclosing member, said view further disclosing a section through the thrust member driving means, said sectional view being taken on line 3—3, Fig. 2; Fig. 4, a sectional view of the automatic take-up means taken on the line 4—4, Fig. 2; Fig. 5, a sectional view taken on the line 5—5, Fig. 1; Fig. 6, a plan view of one of the actuating lever assemblies in its relation to the thrust member and the rear enclosing cover; Fig. 7, an end elevation of one of the driving members for the thrust plate; Fig. 8, a sectional view on the line 8—8, Fig. 2; and Fig. 9, a view of the engaging portions of the adjusting member and its engaged lever.

Similar numerals refer to similar parts throughout the several views.

The flywheel 1 is mounted on the flange 2 of a crankshaft 3 of an engine, the crankshaft 3 being suitably supported in the crank case 4. The flywheel 1 is held onto the flange 2 by the bolts 5. The crank case 4 is provided with a bell housing 6, in which the flywheel revolves. The flywheel 1 is provided with the chamber 7, together with a friction face 8. Friction disc 9 is fastened to the hub 10 by the rivets 11, the hub 10 being suitably mounted on the splines of the shaft 12. The friction ring members 13 and 14 may be suitably fastened to the friction disc 9, the friction ring member 13 being disposed between the friction face 8 of the flywheel 1 and the face of the friction disc 9. The friction ring member 14 is similarly disposed between the face of the friction disc 9 and the thrust ring 15. It is to be noted that the friction disc 9 is constructed of a tapered section, the widest portion of the section being riveted to the hub 10, this tapered section extending from the hub 10 to a point just within the inside diameters of the friction ring members 13 and 14, the friction disc 9 being of an equal thickness throughout the surfaces contacted by the friction ring members 13 and 14.

The shaft 12 is supported at its front end in the bearing assembly 16, which is mounted in a recess of the flywheel 1 and at its rear end in the bearing assembly 17, which is mounted in the retainer 18. The bearing assembly 17 is maintained in the retainer 18 by the retainer 19, which incorporates a felt gasket 20 fitting around the shaft 12. The bearing assembly 17 is retained on the shaft 12 by the nuts 21, the nuts 21 being locked in place by the retainer 22. The screws 23 fasten the retainer 19 to the retainer 18, while the screws 24 fasten the retainer 18 to the clutch housing 25, the clutch housing 25 being fastened to the rear face of the bell housing 6 by the screws 26. The cover member 27 is fastened to the rear face of the flywheel 1 by the screws 28, the cover member 27 being provided with an extension portion 29. The cover member 27 is provided with a series of lugs 30, within which fits the spring 31, which is thus supported on the cover member 27 and exerts a thrust against the shoulder 32 of the sleeve member 33, the spring 31 fitting around the shoulder 34 of the sleeve member 33. Sleeve member 33 is slidably mounted in the extension portion 29 of the cover member 27 and is restrained from turning therein by the key 35, the key engaging the extension portion 29 of the cover 27 together with the sleeve 33. The bearing assembly 36 is supported on the sleeve member 33 and is retained thereon by the threaded member 37.

The pedal 38 is suitably mounted on and connected with the shaft 39, the pedal 38 being located on the outside of the housing 25 in the conventional manner as employed in automotive vehicles. The shaft 39 is suitably supported between bearings carried on opposite sides of the clutch housing 25 and is provided with the yoke member 40, which is clamped to the shaft 39 by the screws 41. The yoke member 40 is provided with a pair of arms 42, which extend down each side of the sleeve member 33. The arms 42 of the yoke member 40 are further provided with the round bosses 43, which engage the front face of the bearing assembly 36. The thrust ring 15 is provided with the three members 44, which are threaded into the thrust ring 15, the member 44 being provided with a hexagonal portion for assembling same. The members 44 are each provided with a chamber 45, which encloses the automatically operated clearance take-up device or mechanism A.

The clearance take-up device A comprises the member 46, which is mounted around the shaft 47 and within the chamber 45 of the member 44. The shaft 47 is provided with a tapered portion 48, together with an extension portion 49, on which is mounted the retainer 50, the retainer 50 being fastened to the extension portion 49 by the pin 51. The member 46 is provided with holes 52 drilled through its side walls and in which are contained the ball members 53. The member 46, together with the retainer 50, are each provided with a shoulder at their inner ends, over which is mounted the spring 54. The shaft 47 is further provided with a shoulder portion 55 together with an extension portion 56, the extension portion 56 passing through the cover member 27. The outer end of the extension portion 56 is provided with the threaded nut 57 and the washer 58. It is to be noted that when the clutch assembly is in its released position, as shown in Fig. 1, the clearance space 59 will exist between the friction face 8 of the flywheel and the face of the friction ring member 13. Also, the clearance space 60 will exist between the front face of the thrust ring 15 and the face of the friction ring member 14.

It is to be noted that the clearance take-up device A will maintain the clearances 59 and 60 when the clutch is in its released position. It is to be further noted that the shoulder portion 55 will be adjusted by the nut 57 to provide the clearance space 61 between the cover member 27 and the face of the shoulder portion 55, the width of the space 61 being selected in accordance with the desired width of clearance spaces 59 and 60. It is to be further noted that the spring 54 seated on the retainer 50 will continually bear against the end of the member 46 and thus force the ball members 53 up the tapered portion 48 of the shaft 47, which will cause the ball members 53 to engage the inner wall of the chamber 45 of the member 44 and the tapered portion 48 of the shaft 47 in such a manner as to provide a clutch action. Thus any force which tends to collapse the member 46 and the member 44 tends to cause the ball members 53 to ride up the tapered portion of the pins and to lock the members 46 and 44 together to prevent any further collapsing action of the same. Any forces tending to distend the members 46 and 44 tends to cause the ball members 53 to ride down the tapered portion 48 of the shaft 47, thus releasing the two members 46 and 44 and permitting the same to relatively move axially.

Whenever the friction ring members 13 and 14 become worn and it would ordinarily be necessary in the usual design of clutches to manually adjust the thrust ring 15 to a closer position with the friction ring members 13 and 14, my invention together with its take-up clearance device A will operate by allowing the member 44 to be moved forward, as hereinafter disclosed, the ball members releasing the members 46 and 44 whenever the thrust member is thus caused to move toward the friction ring members 13 and 14. When the thrust ring 15 is returned, as hereinafter disclosed, to its released position, the springs 62 will always tend to pull the thrust ring 15 rearwardly until the face of the shouldered portion 55 of the shaft 47 contacts with the inner face of the cover member 27, as shown in Fig. 1.

It is thus to be especially noted that with the take-up clearance device A very minute clearances between the friction ring members 13 and 14 and their respectively engaging members as occasioned by the wear of the friction ring members 13 and 14 will be constantly taken up, the automatically operating clearance take-up device A being further and further expanded to compensate for the wear in the friction ring members 13 and 14. The clearance spaces 59 and 60 are to be predetermined to give the best release operation of the clutch assembly and, when this has been determined, the space 61 is thus adjusted to correspond with this predetermined and desired release operation clearance spaces 59 and 60. The springs 62 are respectively fastened to the portion 63 of the cover member 27 and the clip 64, which is interposed between the shoulder portion of the member 44 and the thrust ring 15.

The drive members 65 are suitably fastened to the cover member 27 and are so located as to be in alignment with the members 44, which are fastened to the thrust ring 15, the outer diameter of the members 44 slidably fitting within the inside surface of the hole 66 of the drive member 65. It is to be noted that the drive member 65 will thus form a member for driving the members 44 together with their attached thrust ring 15 at all times with the cover member 27. This means of driving the thrust ring 15 through the cover member 27 eliminates the necessity of machining the flywheel 1 through its outer walls for the reception of the driving members which engage the outer edges of the usual drive thrust members, thus providing more economical manufacture and at the same time eliminating the necessity of notching the outer diameters of the thrust members together with the consequent manual fitting which is always necessary in the assembly of the thrust members when driven by such means.

The bracket members 67 are suitably attached to the cover member 27 by the rivets 68 and support the levers 69, which are pivotally connected to the bracket members 67 by the pins 70. The two levers 69 are assembled on each side of the lever 71, the lever 71 being pivotally mounted on the pin 72 which is supported in the two levers 69. The sleeve member 33 is provided at its forward ends with a groove 73 in which fit and operate the rounded portions 74 at the lower ends of the levers 69. The sleeve member 33 is further provided with shouldered portions 75 and 76 on which is revolvably mounted the adjusting member 77, which is provided with the bevel faces 78 which engage the inner ends 79 of the lever 71 as disclosed in Fig. 9. The outer ends of the lever 71 engage the rear face of the thrust ring 15. The shoulders 80 at the ends of the bevel faces 78 are engaged by the outer ends of the spring 81, which always tend to force the bevel faces 78 of the adjusting member 77 into engagement with the ends 79 of the lever 71. The springs 81 are suitably anchored to the sleeve member 33. The shaft 12 is suitably provided with the chamber 82 extending throughout its length and which together with the passage 83 and the lubrication connection 84 provide means for conducting lubricant throughout the shaft 12 and through the holes 85 to the bearing assembly 36, sleeve member 33, the splines of the hub 10 and to the bearing assembly 16.

In operation the spring 31 will force the sleeve member 33 forwardly, the groove 73 of the sleeve 33 engaging the rounded portions 74 of the levers 69, forcing the forward end of the lever 71 to engage the thrust ring 15, which thus will be maintained in frictional engagement with the friction ring member 14. The friction ring member 13 will be forced against the friction face 8 of the flywheel 1. The forward end of the lever 71 which is pivoted on the pin 72 carried by the levers 69 will always be maintained in engagement with the thrust ring 15 by the bevel faces of the adjusting member 77 being forced into engagement with the rounded end 79 of the lever 71 at all times by the springs 81. The pressure of the spring 31 as above described will thus tend to cause the friction disc 9 with its friction rings 13 and 14 to revolve with the thrust ring 15 and the flywheel 1, the friction disc 9 thus through its hub 10 driving the clutch shaft 12, which is suitably connected to the transmission units of the motor vehicle in which the clutch assembly is installed. Fig. 2 discloses the clutch assembly in its engaged and driving positions. In Fig. 1 the clutch assembly is disclosed as being in its released position.

The releasing of the clutch is accomplished by the operator depressing the pedal 38, which will revolve the shaft 39 together with its yoke member 40, the round bosses 43 of the yoke member 40 engaging the front face of the bearing assembly 36, which will move the sleeve 33 rearwardly and at the same time compress the spring 31. The rearward movement of the sleeve 33 together with its groove 73 will move the rounded portion 74 of the levers 69 rearwardly, which in turn will move the forward end of the lever 71, thus further maintaining the rounded end 79 of the lever 71 in contact with the bevel faces 78 of the adjusting member 77. The action of the spring 62 will immediately cause the thrust ring 15 to move rearwardly as soon as the sleeve 33 is moved rearwardly, thus causing friction rings 13 and 14 to be immediately released from driving engagement with the thrust ring 15 and friction face 8 of the flywheel 1, whenever the pedal 38 is depressed to release the clutch. This is a distinct advantage in that the friction rings 13 and 14 will be immediately released from any slipping engagement with the thrust surfaces of the flywheel 1 and the thrust ring 15.

In the conventional type of clutch, thrust ring 15 is made of a heavy section which renders more difficult the immediate release from engagement with the friction rings 13 and 14 upon movement of the pedal 38. In my invention, the thrust ring 15 is made of a relatively thin and uniform section, thus reducing the thrust member to a minimum weight. It is to be especially noted that, when the friction rings 13 and 14 become worn even slightly from frictional engagement with the friction faces 8 of the flywheel 1 and with the thrust surface of the thrust ring 15, the thrust ring 15 is moved outwardly by the pressure of the spring 31 to take up the clearance established by the wear however slight of the friction rings 13 and 14. As the thrust ring 15 is moved forwardly by the spring 31 to take up any wear clearances, the member 44 also moves forward with the thrust ring 15, thus tending to collapse the telescopic structure of the member 44 and the member 46, the collapsing tendency of the take-up clearance device A thus tending to cause the ball members 53 to ride up the tapered portion 48 of the shaft 47 and to again lock the telescoping members 44 and 46 together to prevent any further collapsing movement of the take-up clearance device A. It is to be noted that any forces tending to distend the telescoping members 46 will tend to cause the ball members 53 to ride down the tapered portion 48 of the shaft 47, to release the telescoping members 46 and 44 and permit them to move axially, but the take-up clearance device A can not be made to compress or shorten its telescopic length, as the ball members 53 will at once engage the telescoping member 44 and the tapered portion 48 of the shaft 47, thus locking the telescoping take-up clearance device A against any rearward movement and further always tending to urge the thrust ring 15 forwardly to take up any clearances established by the wear of the friction rings 13 and 14.

It is also to be noted that, as soon as the pedal 38 is depressed to release the clutch, the thrust ring 15 will only move rearwardly to a distance corresponding to the clearance 61 as disclosed in Figs. 2 and 4 between the rear face of the shouldered portion 55 of the shaft 47 and the forward surface of the cover 27, the clearance space 61 being predetermined to provide the proper release clearance spaces 59 and 60 for the friction rings 13 and 14 as disclosed in Fig. 1. If desired, the thrust ring 15 may be made of steel plate material and threaded to receive the members 44. The thrust rings 15 may be hardened and ground on their thrust faces to eliminate scuffing of the thrust ring 15 when made of steel or other similar metals. The flywheel 1 is disclosed as being provided with a starting ring gear 87; also bell housing 6 is provided with the inspection covers 88 and 89.

I claim:

1. In a friction clutch, the combination of a driving member, a driven member, a cover member fixed to one of said members and enclosing the other of said members, a thrust member movable longitudinally relative to said cover member, a lever pivotally mounted within said cover member, a lever pivotally mounted on said first mentioned lever, said last mentioned lever engaging said thrust member, a sleeve member extending through said cover member, said sleeve member engaging said first mentioned lever, adjustable means engaging said second mentioned lever, said adjustable means being mounted on said sleeve member, resilient means engaging said adjustable means and said sleeve member, resilient means engaging said sleeve member and said cover member, resilient means tending to always maintain said thrust member in engagement with said second mentioned lever, driving means connecting said cover member and said thrust member and automatically operated clearance take-up means suitably mounted between said thrust member and said cover member.

2. In a friction clutch, the combination of a driving member, a driven member, a thrust member, a cover member fixed to one of said members, a member movable longitudinally relative to said cover member, a lever, a lever mounted on said first mentioned lever, and means for automatically maintaining said first mentioned lever in engagement with said thrust member.

3. In a clutch, the combination of a driving member, a thrust member, a driven member, a cover member closing said driving member, automatically operated clearance take-up means associated with said thrust member, said automatically operated clearance take-up means extending within said driving member, and means for adjusting said automatically operated clearance take-up means, said last mentioned means extending beyond said cover member.

4. In a clutch, the combination of a driving member, a thrust member, a driven member arranged to have a predetermined clearance relative to said driving and said thrust members, a fixed member, and an automatically operated clearance take-up device supported, at one end, on said thrust plate, the other end thereof being slidably mounted in said fixed member.

5. In a clutch, the combination of a driving member, a driven member, a thrust member, means for actuating said thrust member in a plurality of directions, a plurality of automatically operated take-up devices extending approximately at right angles to said thrust plate and arranged in groups located radially around the axis of the clutch, and a member supported on said driving member, said last mentioned member engaging said plurality of automatically operated take-up devices.

6. In a clutch, the combination of a driving member, a driven member, a thrust member, and means for actuating said thrust member, said means comprising a pair of lever members together with a sleeve member, one of said pair of lever members being pivotally supported by the other of said pair of lever members, each of said pair of lever members engaging the sleeve member of said means.

7. In a clutch, the combination of a thrust member, a lever pivotally mounted, means for pivotally moving said lever, and a lever pivotally mounted on said first mentioned lever, and means for pivotally moving said last mentioned lever, said last mentioned lever engaging said thrust member.

8. In a clutch, the combination of a thrust member, a lever pivotally mounted, a member suitably mounted, said last mentioned member being operatively connected with said lever, a second lever pivotally connected with said first mentioned lever, and a second member mounted on said first mentioned member operatively connected with said first mentioned lever, said second lever being operatively connected with said second member.

9. In a clutch, the combination of a driving element, a driven element, a cover member, a thrust member having a thrust seat of unvarying depth, a lever pivotally mounted within said cover member, a lever pivotally connected with said first mentioned lever, said last mentioned lever moving said thrust member, and means adjustable angularly relative to said thrust member, said last mentioned means maintaining said last mentioned lever in position to move said thrust member.

10. In a clutch, the combination of a driving element, a driven element, a thrust member, a cover member, a lever pivotally mounted, said lever being fixed in its pivotally mounted position angularly relative to said cover member, and means operatively connected with said lever, said means being fixed in its position angularly relative to said cover member, said last mentioned means moving said thrust member longitudinally relative to said cover member.

11. In a clutch, the combination of a thrust member and means for actuating said thrust member, said means comprising a sleeve member together with a member having a thrust seat of varying thickness, said member being mounted on said sleeve member.

12. In a clutch, the combination of a disc member and an automatic adjustment mechanism for said disc member, said adjustment mechanism comprising a pair of members together with locking means therebetween, said locking means automatically preventing collapsing of the pair of members relative to each other, said locking means automatically permitting the extension of said pair of members relative to one another, one of said members being provided with a pair of shoulder portions for engaging a portion of the clutch to limit the movement of said member.

13. In a clutch, the combination of a thrust member having a thrust face, a friction member suitably mounted adjacent the thrust face of said thrust member, means for operatively moving said thrust member to engage said friction member, a telescopic member operatively connected with said thrust member, said telescopic member being located adjacent the periphery of said thrust member, said telescopic member being provided with a chamber having a closed end, a member suitably mounted within said telescopic member, and rollably mounted means for connecting said telescopic member and said last mentioned member, said rollably mounted means permitting relative movement of said telescopic and said last mentioned members when moved in one direction, said rollably mounted means further permitting simultaneous movement of said telescopic and said last mentioned members when moved in the opposite direction.

14. In a clutch, the combination of a thrust member having a thrust surface extending approximately at right angles to the axis of the clutch, a friction member engaging said thrust member, means for moving said thrust member to engage said friction member, a sleeve member mounted on said thrust member, a member suitably mounted and extending within said sleeve, said last mentioned member being provided with an external conico-cylindrical surface, and locking means engaging said sleeve member and the external conico-cylinder surface of said last mentioned member, to permit the taking up of clearance due to wear between said thrust and said friction members.

15. In a clutch, the combination of a friction disc, a thrust member engaging said friction disc, a sleeve fixedly mounted on and extending from the rear side of said thrust member, said sleeve being movably operative with said thrust member, said sleeve being provided with an opening having parallel side walls, a member within said sleeve, said member being provided with a conico-cylindrical surface therearound, and locking members for engaging the parallel side walls of the opening of said sleeve together with the conico-cylindrical surface around said last mentioned member.

16. In a clutch, the combination of a friction member, a thrust member movably mounted and adapted to engage said friction member, a cover member, automatically operated means for taking up wear clearance between said friction member and said thrust members, said automatically operated means being suitably mounted and extending between the peripheral portions of said thrust and said cover members, said automatically operated means comprising a pair of telescopic members operatively connected by a plurality of members rollably mounted therebetween, and adjustably actuated means for moving said thrust member to engage said friction member.

17. In a clutch, the combination of a friction member, a thrust member adapted for engagement with said friction member, a cover member, means for releasing said thrust member from engagement with said friction member, resilient means for moving said thrust member, when released, to a predetermined disengaged position, said resilient means being connected with said thrust member and suitably anchored on said cover member, and automatically operated locking means for opposing said resilient means when said thrust member has been moved to said predetermined disengaged position, said automatically operated locking means being operatively connected with said cover member.

18. In a clutch, the combination of a friction member, a thrust member movably mounted relative to said friction member, a cover member, a pair of telescoping members respectively connected to said thrust and said cover members to permit said cover member to drive said thrust member, a third member telescopically mounted relative to said pair of telescoping members, and rollably mounted means for locking said third member and one of said pair of telescoping members against relative movement when said thrust member is in a released position relative to said friction member.

19. In a clutch, the combination of a thrust member, a stud member suitably mounted in said thrust member, said stud member being provided with a chamber extending partially therethrough, a member telescopically associated with said stud member, and rollable members engaging said last mentioned member and the wall of the chamber of said stud member to permit relative axial movement of said telescoping members solely in one direction.

20. In a clutch, the combination of a pair of double end levers pivotally mounted about a common pivot and provided with a member for pivotally supporting a third double end lever, and a third double end lever pivotally supported on said member of said pair of double end levers.

JOHN W. TATTER.